US009398614B2

(12) United States Patent
Kubota et al.

(10) Patent No.: US 9,398,614 B2
(45) Date of Patent: Jul. 19, 2016

(54) DATA COLLECTION SYSTEM, DATA COLLECTION DEVICE, WIRELESS COMMUNICATION DEVICE, AND COMMUNICATION METHOD FOR COLLECTING DATA

(75) Inventors: Hitoshi Kubota, Tokyo (JP); Satoshi Kurosawa, Tokyo (JP); Koichi Ishibashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 108 days.

(21) Appl. No.: 13/514,321

(22) PCT Filed: Jan. 5, 2011

(86) PCT No.: PCT/JP2011/050059
§ 371 (c)(1),
(2), (4) Date: Jun. 7, 2012

(87) PCT Pub. No.: WO2011/089928
PCT Pub. Date: Jul. 28, 2011

(65) Prior Publication Data
US 2012/0250561 A1 Oct. 4, 2012

(30) Foreign Application Priority Data
Jan. 19, 2010 (JP) ................................ 2010-009026

(51) Int. Cl.
*H04W 74/08* (2009.01)
*G08C 19/32* (2006.01)
*H04W 16/14* (2009.01)
*H04W 24/10* (2009.01)

(52) U.S. Cl.
CPC ........... *H04W 74/0816* (2013.01); *G08C 19/32* (2013.01); *H04W 16/14* (2013.01); *H04W 24/10* (2013.01)

(58) Field of Classification Search
CPC . H04L 47/10; H04L 2012/5631; H04L 47/15; H04L 47/70; H04L 12/5602; H04L 47/27; H04L 2012/5635; H04L 2012/5636; H04L 43/50; H04L 43/0852; H04L 43/08; H04L 43/026; H04W 24/00; H04W 74/0816; H04W 16/14; H04W 24/10; H04B 17/003; G08C 19/32

USPC .......................... 370/230, 231, 232, 252, 253
See application file for complete search history.

(56) References Cited

U.S. PATENT DOCUMENTS 5,740,200 A * 4/1998 Kamata .......................... 375/224
7,606,169 B2 * 10/2009 Nelson .......................... 370/254
(Continued)

FOREIGN PATENT DOCUMENTS

CN 1205592 A 1/1999
CN 1829163 A 9/2006
(Continued)

OTHER PUBLICATIONS

International Search Report Issued Feb. 22, 2011 in PCT/JP11/50059 Filed Jan. 5, 2011.
(Continued)

*Primary Examiner* — Mang Yeung
*Assistant Examiner* — Natali N Pascual Peguero
(74) *Attorney, Agent, or Firm* — Oblon, McClelland, Maier & Neustadt, L.L.P.

(57) ABSTRACT

A wireless communication device in a data collection system starts measuring a time when the wireless communication device receives a wireless signal from a data collection device. The wireless communication device changes the wireless channel, transmits a detection signal for detecting the data collection device, and starts measuring a time after transmitting the detection signal when the wireless communication device is unable to receive a next wireless signal from the data collection device even after passage of a predetermined time since the wireless communication device has previously received the wireless signal. The wireless communication device changes the wireless channel to be used, depending on whether the wireless communication device has received a response signal from the data collection device in response to the detection signal within a predetermined time.

11 Claims, 12 Drawing Sheets

(56) References Cited

U.S. PATENT DOCUMENTS

| | | |
|---|---|---|
| 2005/0041753 A1* | 2/2005 | Cunningham ................ 375/285 |
| 2006/0215614 A1* | 9/2006 | Woollett et al. ............... 370/335 |
| 2009/0088605 A1 | 4/2009 | Ross et al. |
| 2009/0168684 A1* | 7/2009 | Shurboff et al. ............. 370/312 |

FOREIGN PATENT DOCUMENTS

| | | | |
|---|---|---|---|
| JP | 10 243580 | 9/1998 | |
| JP | 10 290229 | 10/1998 | |
| JP | 11 55759 | 2/1999 | |
| JP | 11 136732 | 5/1999 | |
| JP | 2000 308157 | 11/2000 | |
| JP | 2009 89379 | 4/2009 | |
| WO | WO 0106709 A1 * | 1/2001 | .......... H04L 12/4035 |

OTHER PUBLICATIONS

Office Action mailed May 5, 2014, in Chinese Patent Application No. 201180006461.4 (with Partial English-language Translation).

\* cited by examiner

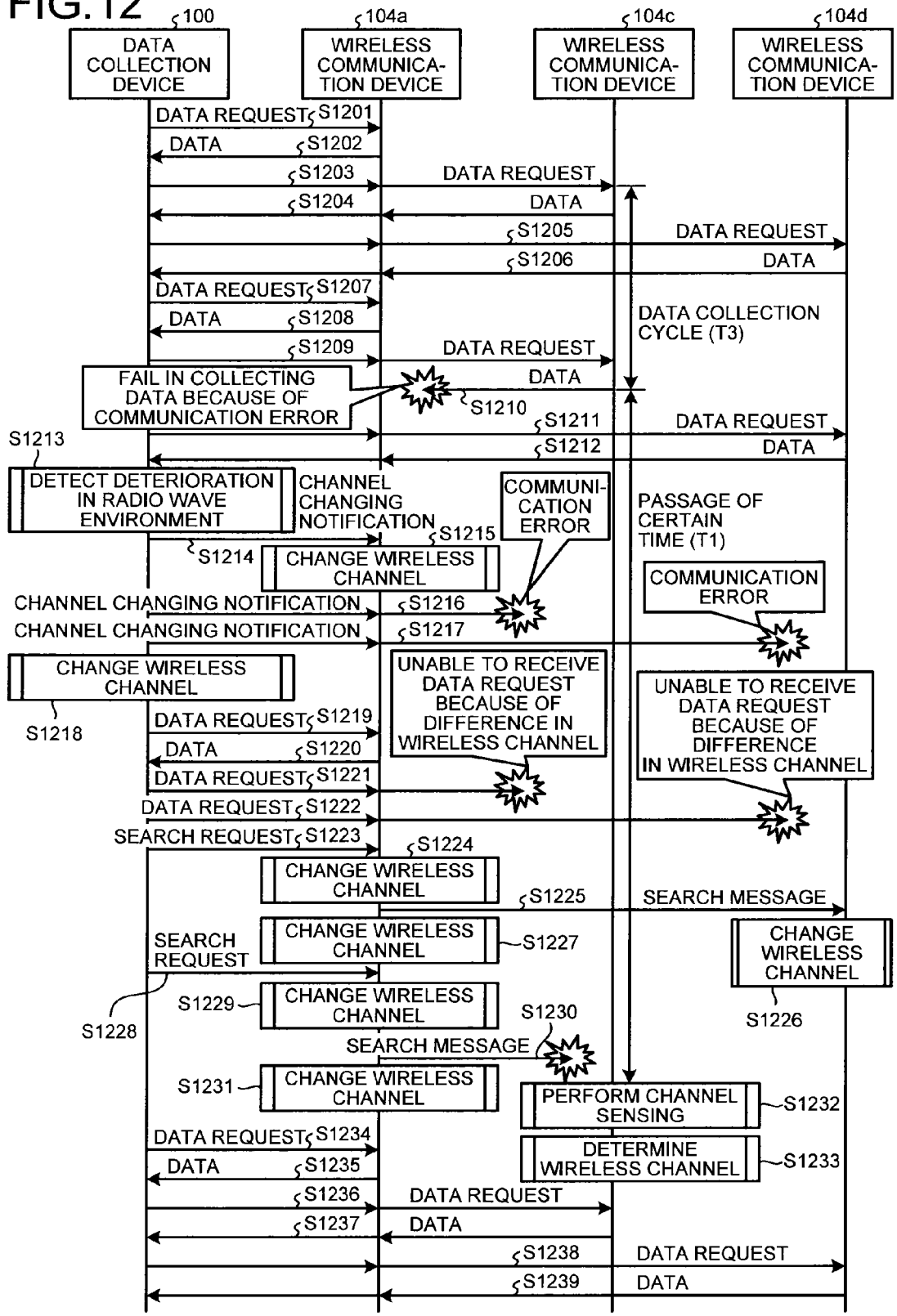

DATA COLLECTION SYSTEM, DATA COLLECTION DEVICE, WIRELESS COMMUNICATION DEVICE, AND COMMUNICATION METHOD FOR COLLECTING DATA

FIELD

The present invention relates to a data collection system that uses wireless communication and the like for avoiding a communication failure even if the communication failure due to an influence of collision of the data collection system with another system in relation to a wireless channel or that of noise generated in a peripheral device.

BACKGROUND

A data collection system described in Patent Literature 1 is a wireless communication system configured to include distributed wireless communication devices. Each of these wireless communication devices is configured to include a data generation device and a wireless adapter connected to the data generation device. This wireless adapter relays data generated in the data generation device connected to the wireless adapter by the communication among a plurality of wireless communication devices, and transmits the data to a data collection device connected to a wireless main device.

In a communicable range of one wireless adapter, two or more other wireless adapters are always arranged. Generally, the one wireless adapter transfers data to a wireless adapter that is out of the communicable range or the wireless main device via these other wireless adapters.

In this way, by arranging two or more wireless adapters in the communicable range, even if a failure occurs to one of the wireless adapters, data can be transmitted to the data collection device by way of a communication path that excludes the fault wireless adapter because the communicable wireless adapters other than the fault wireless adapter are present.

In a network system using wireless communication, a communication failure possibly occurs because of an influence of collision of the network system with another system in relation to a wireless channel, that of noise generated in a peripheral device and the like. When there is the influence of the collision with another system in relation to the wireless channel or that of the noise generated in the peripheral device on the system described in Patent Literature 1 and when the range of the influence spreads throughout the system, the system described in Patent Literature 1 is unable to establish a communication path for avoiding the influence.

Furthermore, when the range of the influence is restrictive, it is possible to collect the data generated by the data generation device connected to the wireless adapter that is not influenced by the collision of the system with another system in relation to the wireless channel or by the noise generated in the peripheral device by way of the communication path that excludes the wireless adapters influenced by the collision or the noise similarly to the case of the failure of the wireless communication device. However, in this case, it is impossible to collect the data generated by the data generation device connected to the wireless adapter influenced by the collision of the system with another system in relation to the wireless channel or by the noise generated in the peripheral device.

CITATION LIST

Patent Literature

Patent Literature 1: Japanese Patent Application Laid-open No. H11-55759

SUMMARY

Technical Problem

That is, in the conventional network system using the wireless communication, a failure possibly occurs to the communication because of the influence of the collision of the system with another system in relation to the wireless channel, that of the noise generated in the peripheral device and the like.

Solution to Problem

A data collection system regarding the present invention includes a data collection device, and at least one wireless communication device, for selecting one wireless channel among a plurality of wireless channels, and for holding a wireless communication between the data collection device and the wireless communication device. The wireless communication device starts measuring a time when the wireless communication device receives a wireless signal from the data collection device. Additionally, the wireless communication device changes the wireless channel, transmits a detection signal for detecting the data collection device, and starts measuring a time after transmitting the detection signal when the wireless communication device is unable to receive a next wireless signal from the data collection device even after passage of a predetermined time since the wireless communication device has previously received the wireless signal. More additionally, the wireless communication device changes the wireless channel to be used, depending on whether the wireless communication device has received a response signal from the data collection device in response to the detection signal within a predetermined time.

Advantageous Effects of Invention

According to the present invention, the data collection system using wireless communication can avoid a communication failure and collect data even if the communication failure due to an influence of collision of the data collection system with another system in relation to a wireless channel, that of noise generated in a peripheral device and the like occurs to the data collection system.

BRIEF DESCRIPTION OF DRAWINGS

FIG. 12 depicts an operation of the data collection system according to the seventh embodiment of the present invention.

DESCRIPTION OF EMBODIMENTS

Exemplary embodiments of a data collection system and other devices according to the present invention will be explained below in detail with reference to the accompanying drawings. The present invention is not limited to the embodiments.

First Embodiment

Figure 1:
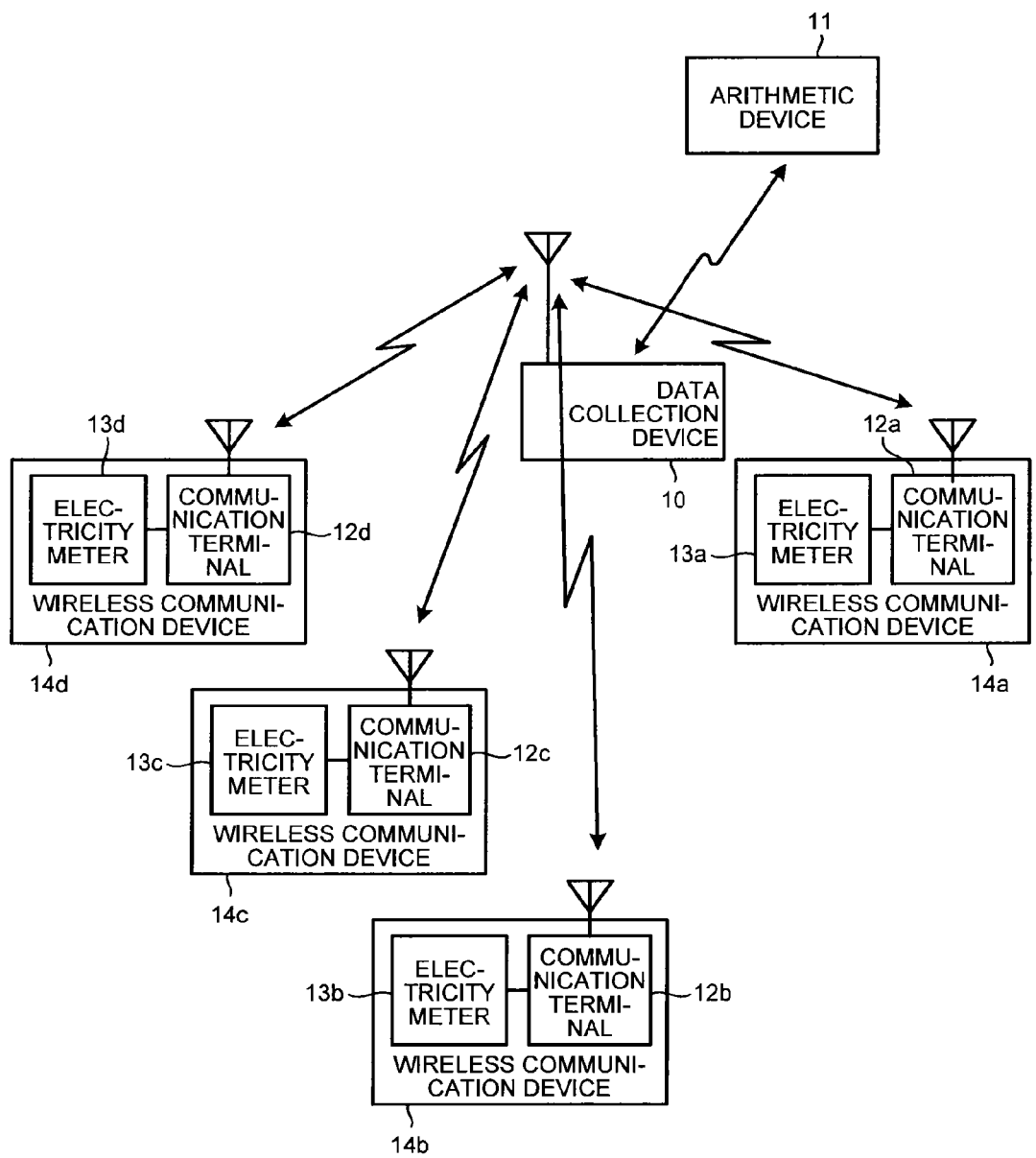
FIG. 1 is a configuration diagram of a configuration of a data collection system according to a first embodiment of the present invention when the system is applied to automated meter reading.

FIG. 1 is a configuration diagram of a configuration of this data collection system when the system is applied to automated meter reading.

The data collection system is configured to include a data collection device 10, an arithmetic device 11 that is connected to the data collection system 10, communication terminals 12a to 12d that communicate with the data collection device 10, and electricity meters 13a to 13d connected to the communication terminals 12a to 12d, respectively. The communication terminal 12a and the electricity meter 13a are connected to each other, and constitute a wireless communication device 14a. The communication terminal 12b and the electricity meter 13b are connected to each other, and constitute a wireless communication device 14b. The communication terminal 12c and the electricity meter 13c are connected to each other, and constitute a wireless communication device 14c. In addition, the communication terminal 12d and the electricity meter 13d are connected to each other, and constitute a wireless communication device 14d.

The data collection device 10 includes a unit that selects a wireless channel, a unit that receives a wireless signal, and a unit that transmits the wireless signal. Each of the wireless communication devices 14a to 14d or the communication terminals 12a to 12d includes a unit that selects a wireless channel, a unit that receives a wireless signal, a unit that transmits the wireless signal, and a time measuring unit.

Figure 2:
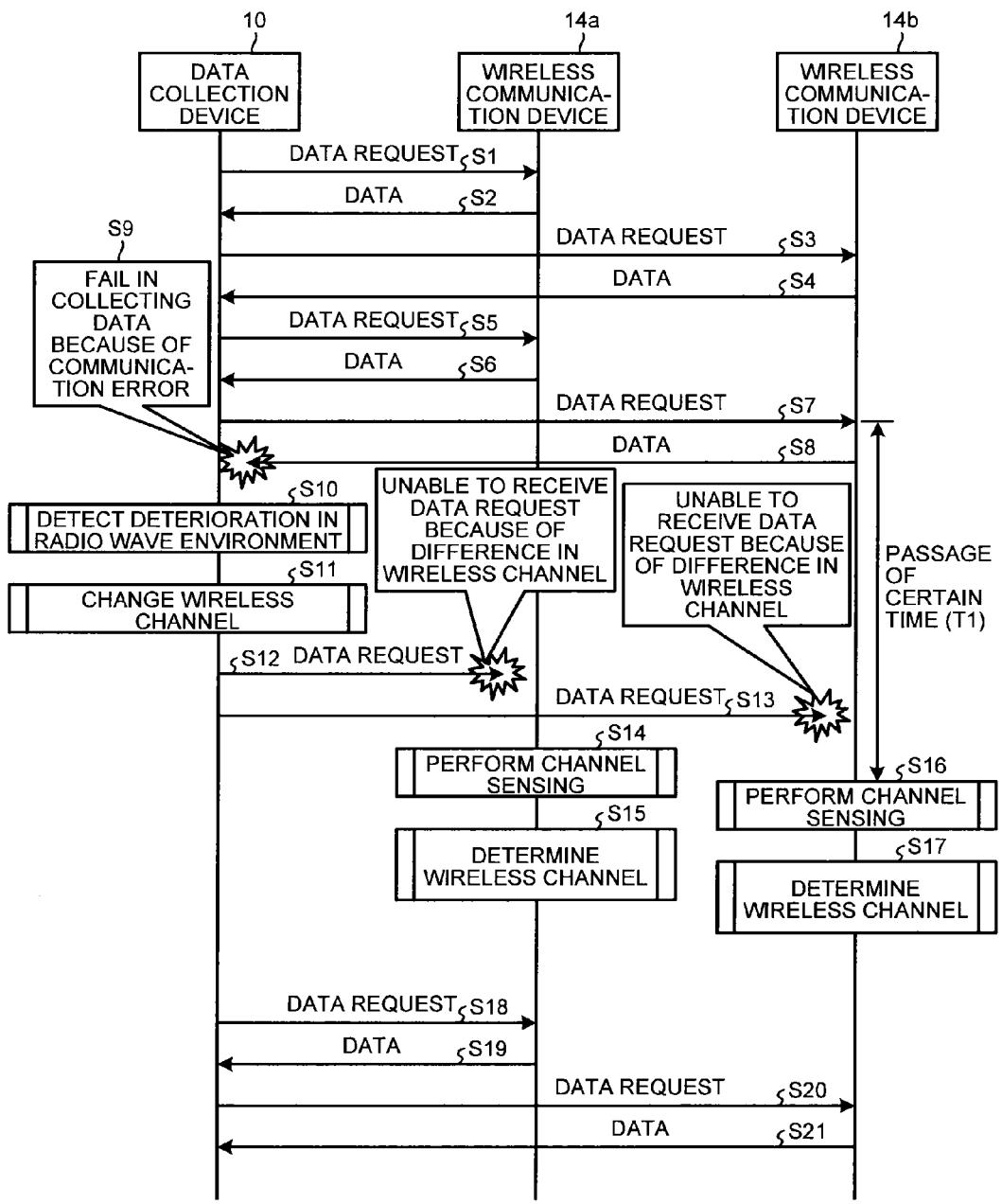
FIG. 2 depicts an operation of the data collection system according to the first embodiment of the present invention.

FIG. 2 depicts an operation of the data collection system.

At Step (S1), the data collection device 10 transmits a data request signal to the wireless communication device 14a. The wireless communication device 14a transmits measured data to the data collection device 10 based on the received data request signal (S2).

At S3, the data collection device 10 transmits a data request signal to the wireless communication device 14b. The wireless communication device 14b transmits measured data to the data collection device 10 based on the received data request signal (S4).

At S5, the data collection device 10 transmits again a data request signal to the wireless communication device 14a in a case of the passage of a cyclic time or the like. The wireless communication device 14a transmits data to the data collection device 10 based on the received data request signal (S6).

At S7, the data collection device 10 transmits again a data request signal to the wireless communication device 14b. The wireless communication device 14b transmits measured data to the data collection device 10 based on the received data request signal (S8).

However, when the data collection device 10 failed in collecting the data transmitted from the wireless communication device 14b because of a communication error (S9), the data collection device 10 determines a deterioration in a radio wave environment (detects a deterioration in a radio wave environment) (S10).

Following detection of the deterioration in the radio wave environment (S10), the data collection device 10 changes a wireless channel for data transmission (S11).

At S12, the data collection device 10 transmits a data request signal to the wireless communication device 14a. However, the wireless communication device 14a is unable to receive the data request signal because the data collection device 10 has changed the wireless channel (S11).

At S13, the data collection device 10 transmits a data request signal to the wireless communication device 14b. However, similarly to the wireless communication device 14a, the wireless communication device 14b is unable to receive the data request signal because the data collection device 10 has changed the wireless channel (S11).

The wireless communication device 14a is still unable to receive a new data request signal even after the passage of a certain time period (T1) since the wireless communication device 14a has received the previous data request signal (S5). Accordingly, the wireless communication device 14a performs a channel sensing process for confirming whether the wireless channel for the data communication has been changed (S14). The wireless communication device 14a can start the channel sensing process either after the passage of the certain time period since the wireless communication device 14a has received the data request signal or after the passage of a certain time period since the wireless communication device 14a has transmitted the measured data corresponding to the data request signal.

As a result of the channel sensing process (S14), when the wireless communication device 14a can confirm the wireless channel for the data communication by the use of which the wireless communication device 14a can receive a new data request signal from the data collection device 10, the wireless communication device 14a determines the wireless channel (S15).

Similarly to the wireless communication device 14a, the wireless communication device 14b is still unable to receive a new data request signal even after the passage of the certain time period (T1) since the wireless communication device 14b has received the previous data request signal (S7). Accordingly, the wireless communication device 14b performs the channel sensing process for confirming whether the wireless channel for the data communication has been changed (S16).

As a result of the channel sensing process (S16), when the wireless communication device 14b can confirm the wireless channel for the data communication by the use of which the wireless communication device 14b can receive a new data request signal from the data collection device 10, the wireless communication device 14b determines the wireless channel (S17).

At S18, the data collection device 10 transmits a data request signal to the wireless communication device 14a by the use of the changed wireless channel. The wireless communication device 14a transmits measured data to the data collection device 10 by the use of the changed channel based on the received data request signal (S19).

At S20, the data collection device 10 transmits a data request signal to the wireless communication device 14b by the use of the changed wireless channel. The wireless communication device 14b transmits measured data to the data collection device 10 by the use of the changed channel based on the received data request signal (S21).

Figure 3:
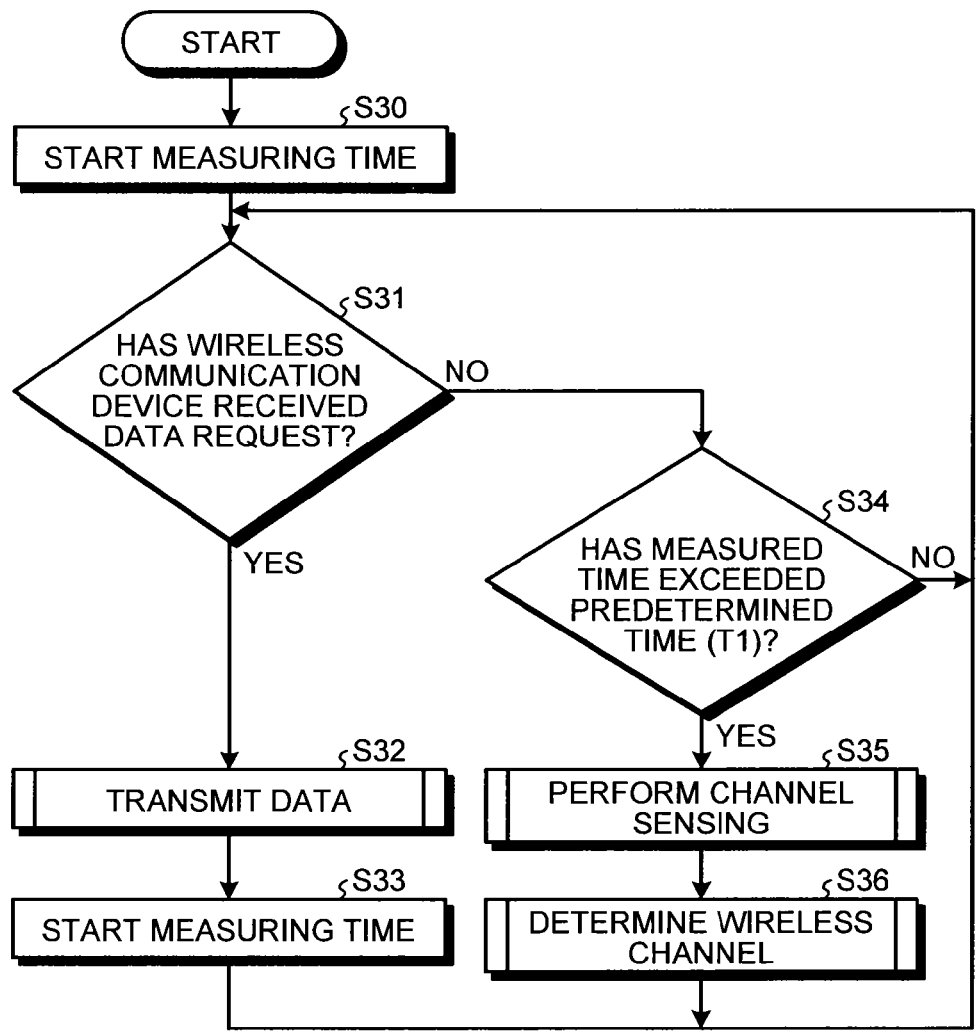
FIG. 3 is a flowchart of an operation of a wireless communication device in the data collection system according to the first embodiment of the present invention.

FIG. 3 is a flowchart of an operation performed by each of the wireless communication devices in the data collection system.

When each of the wireless communication devices 14a to 14d starts operating, each of the wireless communication devices 14a to 14d starts measuring a time (time measuring) (S30). Thereafter, each of the wireless communication devices 14a to 14d determines whether each of the wireless communication devices 14a to 14d has received the data request signal transmitted from the data collection device 10 (S31). The data request signal is transmitted from the data collection device 10 to each of the wireless communication devices 14a to 14d from which the data collection device 10 is to collect data.

Each of the wireless communication devices 14a to 14d that has received the data request signal transmits read data acquired from each of the electricity meters 13a to 13d included in the wireless communication devices 14a to 14d, respectively to the data collection device 10 (S32).

Each of the wireless communication devices 14a to 14d that has transmitted the read data starts measuring a time (time measuring) from a time of transmitting the read data (S33).

It suffices that each of the wireless communication devices 14a to 14d measures the time from the time of transmitting the read data or from a time of receiving the data request signal.

Each of the wireless communication devices 14a to 14d that has not received the data request signal transmitted from the data collection device 10 determines whether the measured time exceeds the predetermined time (T1) (S34). If the measured time has not exceeded the predetermined time (T1), each of the wireless communication devices 14a to 14d determines whether each of the wireless communication devices 14a to 14d has received the data request signal transmitted from the data collection device 10 (S31).

When the measured time exceeds the predetermined time (T1), each of the wireless communication devices 14a to 14d performs the channel sensing process (S35).

As a result of the channel sensing process (S35), when each of the wireless communication devices 14a to 14d can confirm the wireless channel for the data transmission by the use of which each of the wireless communication devices 14a to 14d can receive the data request signal transmitted from the data collection device 10, each of the wireless communication devices 14a to 14d determines the wireless channel (S36).

Examples of the case where the measured time exceeds the predetermined time (T1) include a case where the data collection device 10 has changed the wireless channel for transmitting the various signals and where each of the wireless communication devices 14a to 14d is unable to receive the data request signal from the data collection device 10.

The data collection device 10 can change the wireless channel in this way by transmitting a wireless-channel changing instruction when the arithmetic device 11 that is connected to the data collection device 10 detects the deterioration in the radio wave environment of the wireless channel now in use based on an occurrence status in which the data collection device 10 fails in collecting the data.

Figure 4:
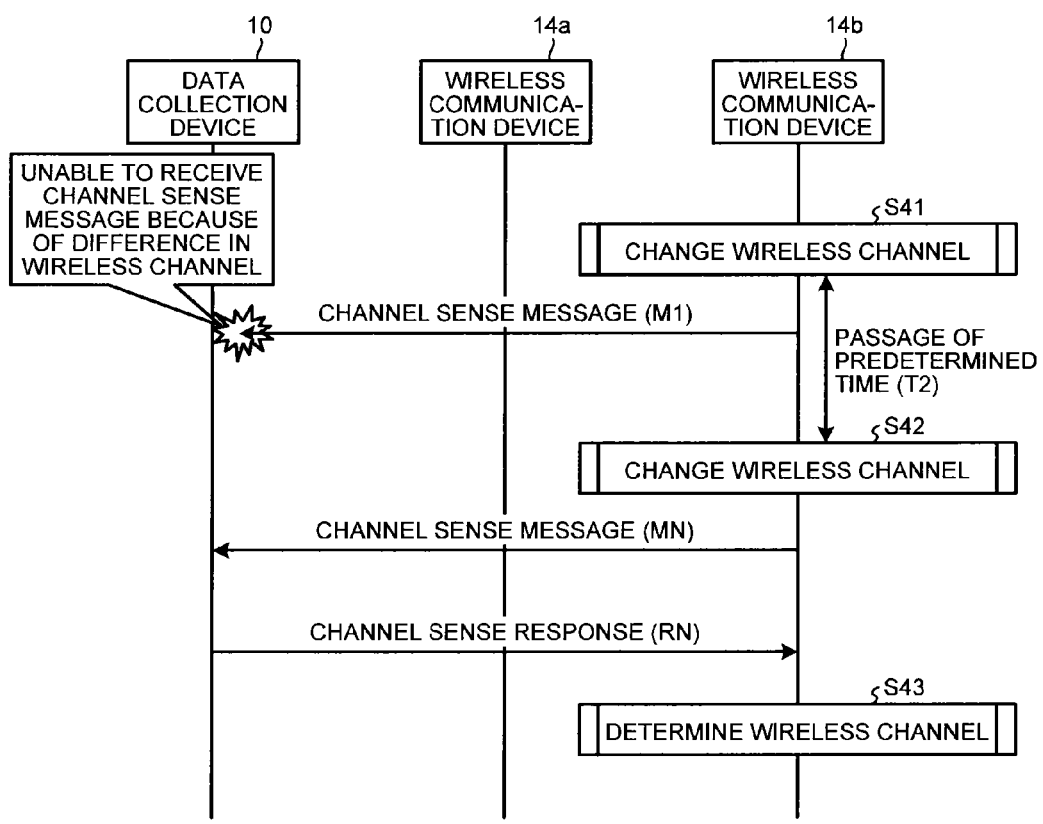
FIG. 4 depicts an operation in a channel sensing process performed by the data collection system according to the first embodiment of the present invention.

FIG. 4 depicts an operation in the channel sensing process performed by the data collection system. When the wireless communication device 14b is unable to receive the data request signal transmitted from the data collection device 10 because the data collection device 10 has changed the wireless channel, the wireless communication device 14b starts the channel sensing process. In addition, the wireless communication device 14b changes the wireless channel (S41) and starts measuring the time. Further, the wireless communication device 14b transmits a channel sense message (a detection signal M1) that is a test signal to the data collection device 10 by the use of the changed wireless channel.

When the wireless communication device 14b is unable to receive a channel sense response (a response signal R1) indicating that the data collection device 10 has correctly received the channel sense message (M1) (a channel sense response (the response signal R1) in response to the channel sense message (M1)) from the data collection device 10 even after the passage of a predetermined time (T2) since the wireless communication device 14b has transmitted the channel sense message (M1), the wireless communication device 14b changes again the wireless channel (S42) and starts measuring a time. The wireless communication device 14b transmits a channel sense message (M2) to the data collection device 10 by the use of the further changed wireless channel.

The wireless communication device 14b repeatedly transmits the channel sense messages while changing the wireless channels until the wireless communication device 14b receives the channel sense response from the data collection device 10 in response to the channel sense message.

When the wireless communication device 14b receives a channel sense response (RN) transmitted from the data collection device 10 after the wireless communication device 14b has transmitted a channel sense message (MN), the wireless communication device 14b determines the wireless channel (S43) and finishes the channel sensing process. The wireless channel determined at that time is used for subsequent communication.

Figure 5:
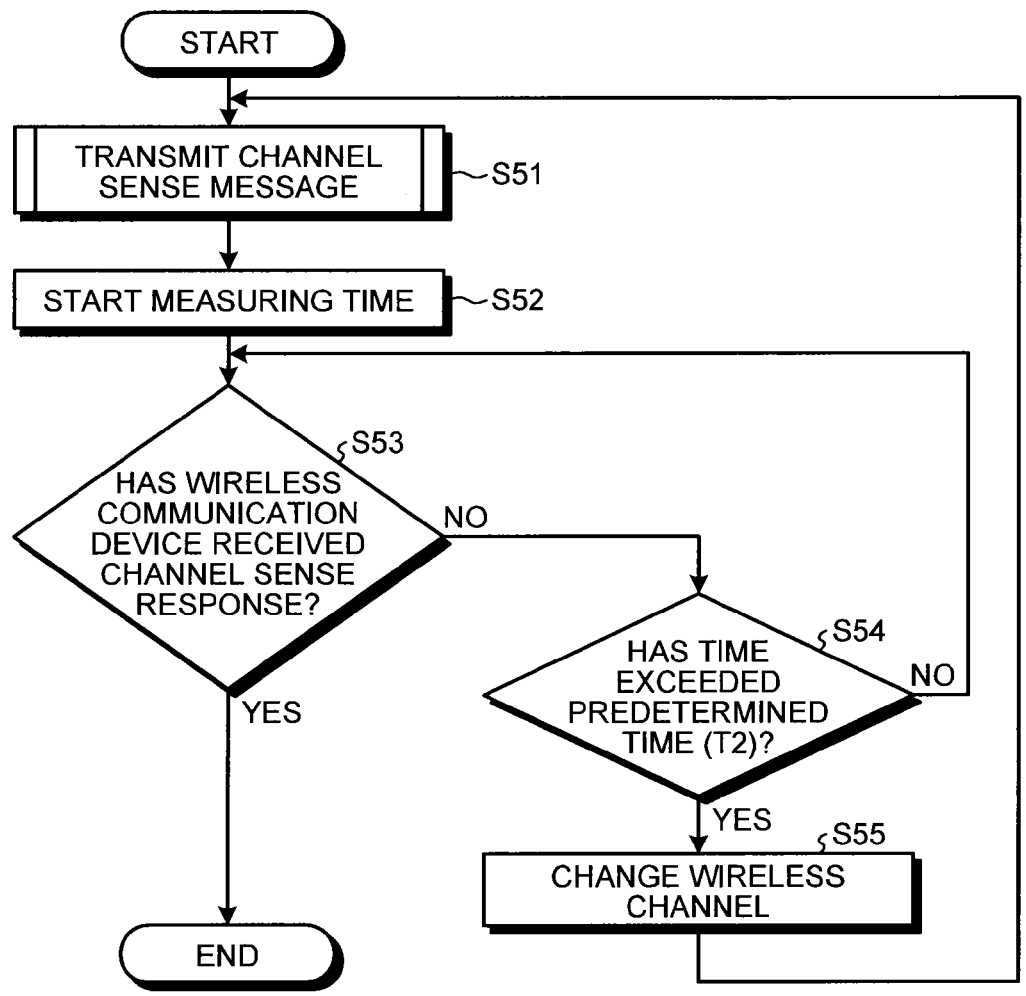
FIG. 5 is a flowchart of an operation of the wireless communication device for the channel sensing process in the data collection system according to the first embodiment of the present invention.

FIG. 5 is a flowchart of an operation performed by each of the wireless communication devices for the channel sensing process in the data collection system.

When the wireless communication device 14b is unable to receive the data request signal transmitted from the data collection device 10 because the data collection device 10 has changed the wireless channel, the wireless communication device 14b starts the channel sensing process and changes the wireless channel. The wireless communication device 10b transmits the channel sense message to the data collection device 10 by the use of this changed wireless channel (S51). Further, the wireless communication device 14b starts measuring the time (S52) after transmitting the channel sense message.

Thereafter, the wireless communication device 14b checks whether the wireless communication device 14b has been able to receive the channel sense response in response to the transmitted channel sense message (S53).

When the wireless communication device 14b is unable to receive the channel response message in response to the transmitted channel sense message, the wireless communication device 14b confirms whether the time the measuring of which starts at S52 exceeds the predetermined time (T2) (S54).

When the measured time exceeds the predetermined time (T2), the wireless communication device 14b changes the wireless channel (S55) and returns the processing to S53.

At S53, when the wireless communication device 14b can confirm that the wireless communication device 14b has been able to receive the channel sense response from the data collection device 10 or another wireless communication device in response to the channel sense message transmitted by the wireless communication device 14b, the wireless communication device 14b determines the wireless channel by the use of which the wireless communication device 14b has been able to receive the channel sense response, and finishes the channel sensing process. Thereafter, the wireless communication device 14b holds communication by the use of the determined wireless channel.

Examples of a connection configuration of connecting the data collection device 10 to the arithmetic device 11, connecting the communication terminal 12a to the electricity meter 13a and the like may include a connection configuration via a serial interface or the like and that via an optical circuit. However, the connection configuration is not limited to these examples.

As described above, when the data collection device 10 detects the deterioration in the radio wave environment, the data collection device 10 changes the wireless channel between the data collection device 10 and the wireless communication devices 14a to 14d. When each of the wireless communication devices 14a to 14d is unable to receive the data request signal from the data collection device 10 for a predetermined time period, then each of the wireless communication devices 14a to 14d determines that the wireless channel between the data collection device 10 and the wireless communication devices 14a to 14d has been changed, detects the wireless channel used by the data collection device 10 by performing the channel sensing process, and uses the detected wireless channel. By performing a series of these processes, the data collection device 10 and the wireless communication devices 14a to 14d can avoid a communication failure and can transmit or receive data even when the communication failure due to an influence of noise and the like occurs.

Second Embodiment

Figure 6:
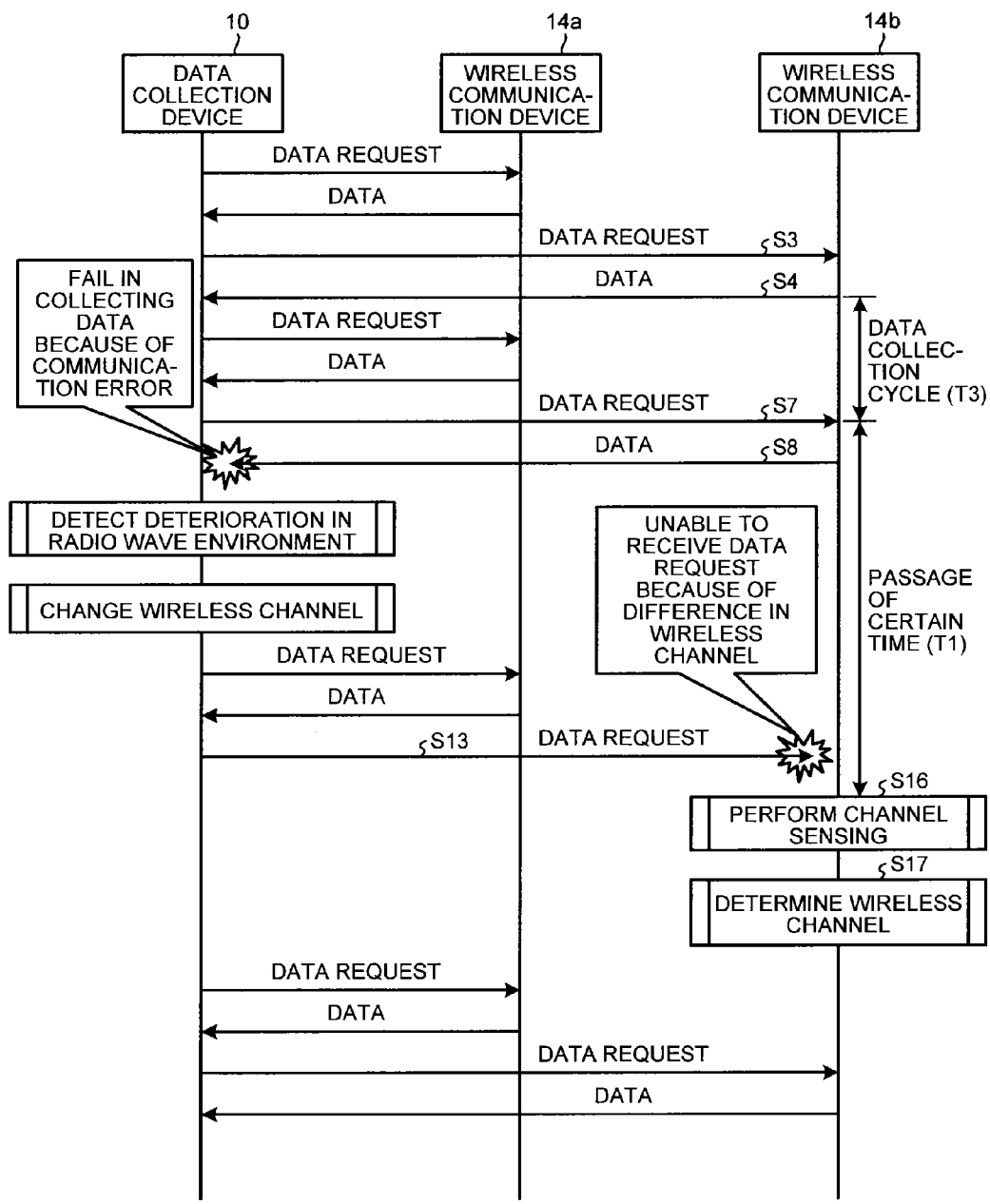
FIG. 6 depicts an operation of a data collection system according to a second embodiment of the present invention.

FIG. 6 depicts an operation of a data collection system according to a second embodiment.

The data collection device 10 transmits the data request signals to the respective wireless communication devices in a certain cycle (T3) (S3 and S7). Similarly, the wireless communication devices receive the data request signals transmitted from the data collection device 10, respectively in the certain cycle (T3) (S3 and S7).

When each of the wireless communication devices is unable to receive a next data request signal (S7 or S13) even after the passage of the predetermined time period (T1) longer than the certain cycle (T3) since each of the wireless communication devices has received the previous data request signal until each of the wireless communication devices receives the next data request signal, each of the wireless communication devices performs the channel sensing process (S16), detects the wireless channel to be used by each of the wireless communication devices, and changes settings.

As described above, the data collection device 10 transmits the data request signal to each of the wireless communication devices in the certain cycle (T3). In addition, each of the wireless communication devices receives the data request signal transmitted from the data collection device 10 in the certain cycle (T3).

Furthermore, when each of the wireless communication devices is unable to receive the data request signal for the time period (T1) longer than the transmission cycle (T3) in which the data collection device 10 transmits the data request signal to each of the wireless communication devices, each of the wireless communication devices determines that the wireless channel used by the data collection device 10 has been changed, performs the channel sensing process, and detects the wireless channel used by the data collection device 10. Each of the wireless communication devices can efficiently detect a wireless-channel changing process performed by the data collection device 10 by the use of this detected wireless channel, and it is possible to collect the data while efficiently avoiding an influence of noise and the like.

Third Embodiment

Figure 7:
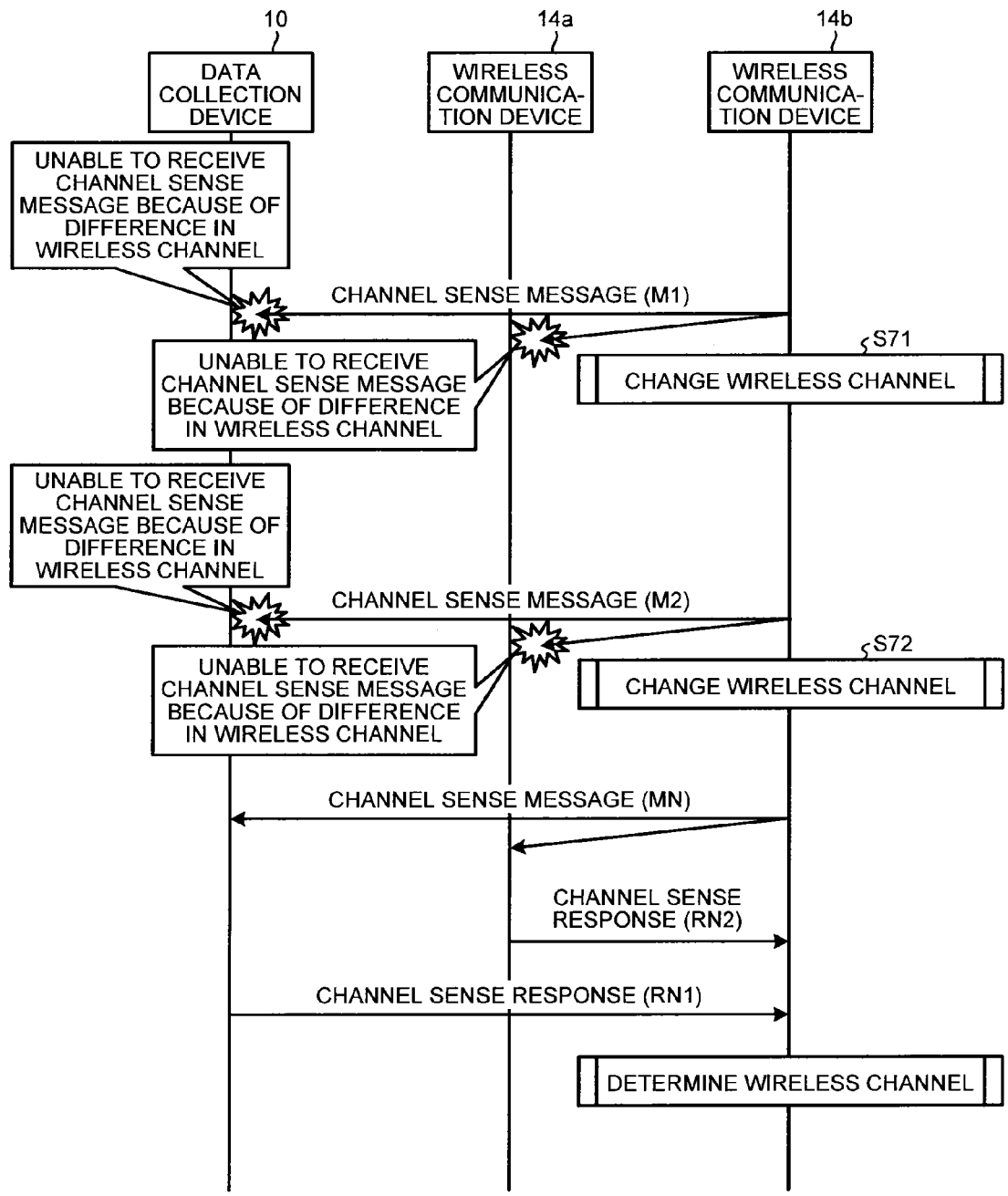
FIG. 7 depicts an operation in a channel sensing process performed by a data collection system according to a third embodiment of the present invention.

FIG. 7 depicts an operation in a channel sensing process performed by a data collection system according to a third embodiment.

When the wireless communication device 14b is unable to receive a data request signal transmitted from the data collection device 10 because the data collection device 10 has changed a wireless channel, the wireless communication device 14b performs the channel sensing process (S71) and changes the wireless channel (#1→#2).

Thereafter, the wireless communication device 14b transmits a channel sense message (M2) to each of the data collection device 10 and the wireless communication device 14a by the use of this changed wireless channel #2.

The wireless communication device 14b transmits the channel sense message (M2) to each of the data collection device 10 and the wireless communication device 14a by broadcast communication.

When the wireless communication device 14b is unable to receive the channel sense response from each of the data collection device 10 and the wireless communication device 14a in response to the channel sense message (M2) although the wireless communication device 14b has transmitted the channel sense message (M2), the wireless communication device 14b changes again the wireless channel (#2→#3) (S72).

The wireless communication device 14b transmits the channel sense message (MN) to each of the data collection device 10 and the wireless communication device 14a by broadcast communication by the use of the further changed wireless channel #3.

The data collection device 10 that has received the channel sense message (MN) transmits a channel sense response (RN1) to the wireless communication device 14b. In addition, the wireless communication device 14a (that has received the channel sense message (MN)) transmits a channel sense response (RN2) to the wireless communication device 14b. In this way, the data collection device 10 and the wireless communication device 14b that have received the channel sense messages (MN) transmit the channel sense responses to the wireless communication device 14b, respectively.

When the wireless communication device 14b receives the channel sense responses from the data collection device 10 and the wireless communication device 14a, respectively after transmitting the channel sense message (MN), the wireless communication device 14b determines the wireless channel and finishes the channel sensing process. The wireless channel determined at that time is used for subsequent communication.

In this way, by transmitting the channel sense messages by broadcast communication, it is possible to transmit the channel sense message to a plurality of devices such as the data collection device 10 and the wireless communication device at a time, and reduce communication traffic for detecting the wireless channels to be used. It is also possible to collect the data while efficiently avoiding an influence of noise and the like.

Fourth Embodiment

Figure 8:
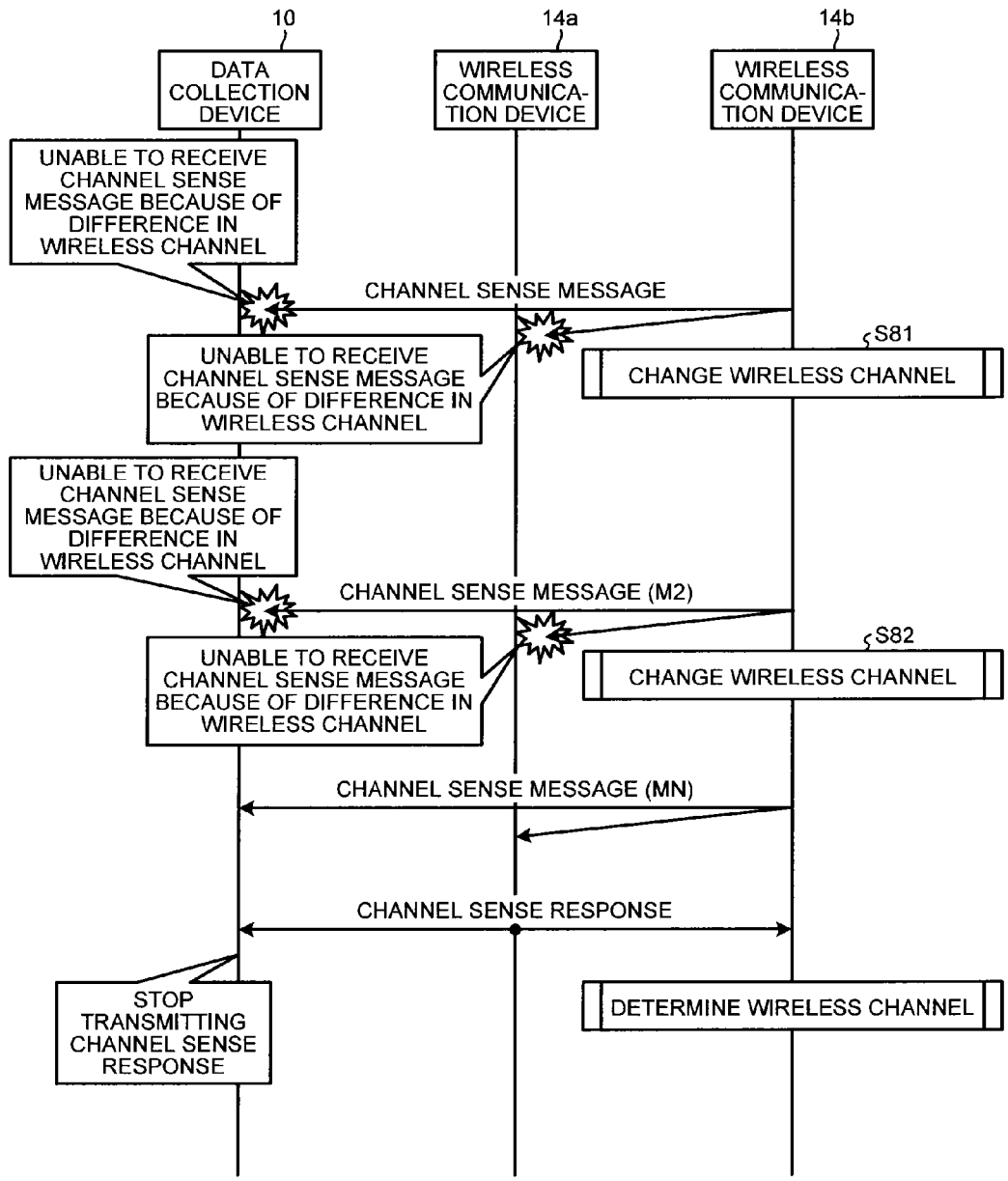
FIG. 8 depicts an operation in a channel sensing process performed by a data collection system according to a fourth embodiment of the present invention.

FIG. 8 depicts an operation in a channel sensing process performed by a data collection system according to a fourth embodiment.

When the wireless communication device 14*b* is unable to receive the data request signal transmitted from the data collection device 10 because the data collection device 10 has changed the wireless channel, the wireless communication device 14*b* performs the channel sensing process (S81) and changes the wireless channel (#1→#2).

Thereafter, the wireless communication device 14*b* transmits the channel sense message (M2) to each of the data collection device 10 and the wireless communication device 14*a* by the use of this changed wireless channel #2.

That is, the wireless communication device 14*b* transmits the channel sense message (M2) to each of the data collection device 10 and the wireless communication device 14*a* by broadcast communication.

When the wireless communication device 14*b* is unable to receive the channel sense response from each of the data collection device 10 and the wireless communication device 14*a* in response to the channel sense message (M2) although the wireless communication device 14*b* has transmitted the channel sense message (M2), the wireless communication device 14*b* changes again the wireless channel (#2→#3) (S82).

The wireless communication device 14*b* transmits the channel sense message (MN) to each of the data collection device 10 and the wireless communication device 14*a* by broadcast communication by the use of the further changed wireless channel #3.

The wireless communication device 14*a* that has received the channel sense message (MN) transmits the channel sense response (RN2) to each of the data collection device 10 and the wireless communication device 14*b* by multicast communication.

On the other hand, the data collection device 10 receives the channel sense message (MN). However, when the data collection device 10 receives the channel sense response (RN2) from the wireless communication device 14*a* before the data collection device 10 transmits the channel sense response (RN1) (to each of the wireless communication devices 14*a* and 14*b*) by multicast communication, the data collection device 10 stops transmitting the channel sense response (RN1) by multicast communication.

When the wireless communication device 14*b* receives the channel sense response (RN2) transmitted from another wireless communication device 14*a* after transmitting the channel sense message (MN), the wireless communication device 14*b* determines the wireless channel and finishes the channel sensing process. The wireless channel determined at that time is used for subsequent communication.

As described above, the device transmits the channel sense response to each of a plurality of devices such as the data collection device 10 and the wireless communication device by broadcast communication at a time. In addition, when the device that has received the channel sense message receives the channel sense response transmitted from another device before the device transmits the channel sense response, the device stops transmitting the channel sense response that the device is to transmit. With this configuration, it is possible to reduce the communication traffic (a communication load) for detecting the wireless channels to be used and collect the data while efficiently avoiding an influence of noise and the like.

Fifth Embodiment

Figure 9:
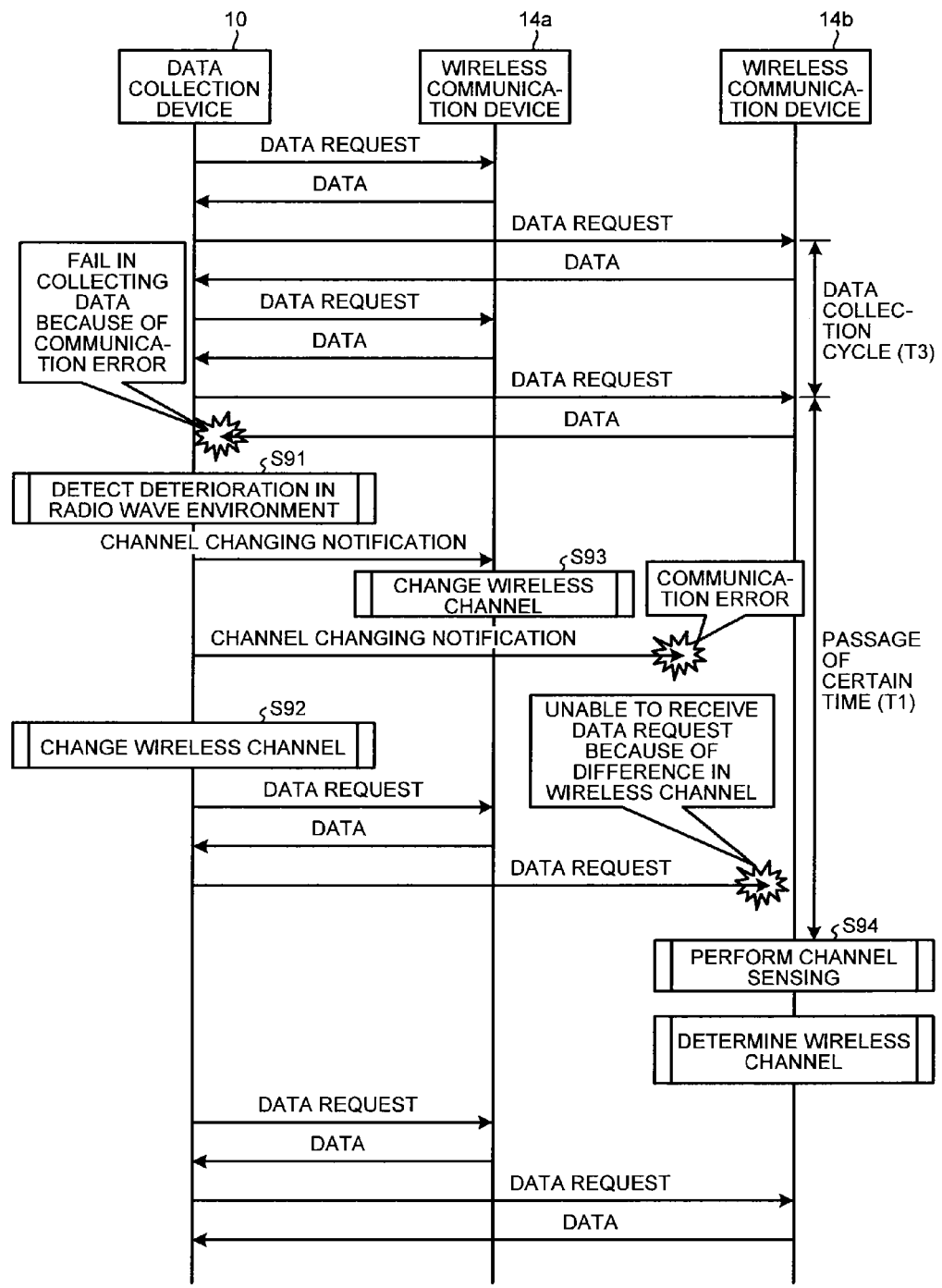
FIG. 9 depicts an operation of a data collection system according to a fifth embodiment of the present invention.

FIG. 9 depicts an operation of a data collection system according to a fifth embodiment.

The arithmetic device 11 connected to the data collection device 10 can detect the deterioration in the radio wave environment of the wireless channel now in use from the occurrence status in which the data collection device 10 fails in collecting the data because of a communication error, and can instruct the data collection device 10 and the like to change the wireless channel to be used (S91). The arithmetic device 11 can be provided in the data collection device 10.

The data collection device 10 changes the wireless channel to be used based on an instruction from the arithmetic device 11 (S92).

The data collection device 10 transmits a channel changing notification to each of the wireless communication devices based on the detected deterioration in the radio wave environment.

The wireless communication device 14*a* that has received the channel changing notification from the data collection device 10 changes the wireless communication now in use to the wireless communication of which the wireless communication device 14*a* is notified by the channel changing notification (S93).

On the other hand, when receiving the data request signal transmitted from the data collection device 10, each of the wireless communication devices starts measuring a passing time since receiving the data request signal. When each of the wireless communication devices is not able to receive the next data request signal even after the passage of the predetermined time (T1) since each of the wireless communication devices has received the data request signal, each of the wireless communication devices performs the channel sensing process.

For example, the wireless communication device 14*b* that has not be able to receive the channel changing notification transmitted from the data collection device 10 because of a communication error or the like performs the channel sensing process (S94) and detects the wireless channel used by the data collection device 10 when the wireless communication device 14*b* is unable to receive the next data request signal even after the passage of the predetermined time (T1) since the wireless communication device 14*b* has received the previous data request signal (because of a difference in the wireless channel to be set between the data collection device 10 and the wireless communication device 14*b* or the like).

As described above, when the data collection device 10 or the arithmetic device 11 detects the deterioration in the radio wave environment between the data collection device 10 and the wireless communication devices, the data collection device 10 transmits the channel changing notification to each of the wireless communication devices and instructs each of the wireless communication devices to change the wireless channel. On the other hand, when the wireless communication device that has not been able to receive the channel changing notification is unable to receive the next data request signal even after the passage of the reception interval (T3) of the data request signal, the wireless communication device recognizes (detects) that the data collection device 10 has changed the wireless channel for use in the transmission of the data request signal, performs the channel sensing process, detects the wireless channel now in use by the data collection device 10, and enables data to be collected while avoiding an influence of noise or the like.

Sixth Embodiment

Figure 10:
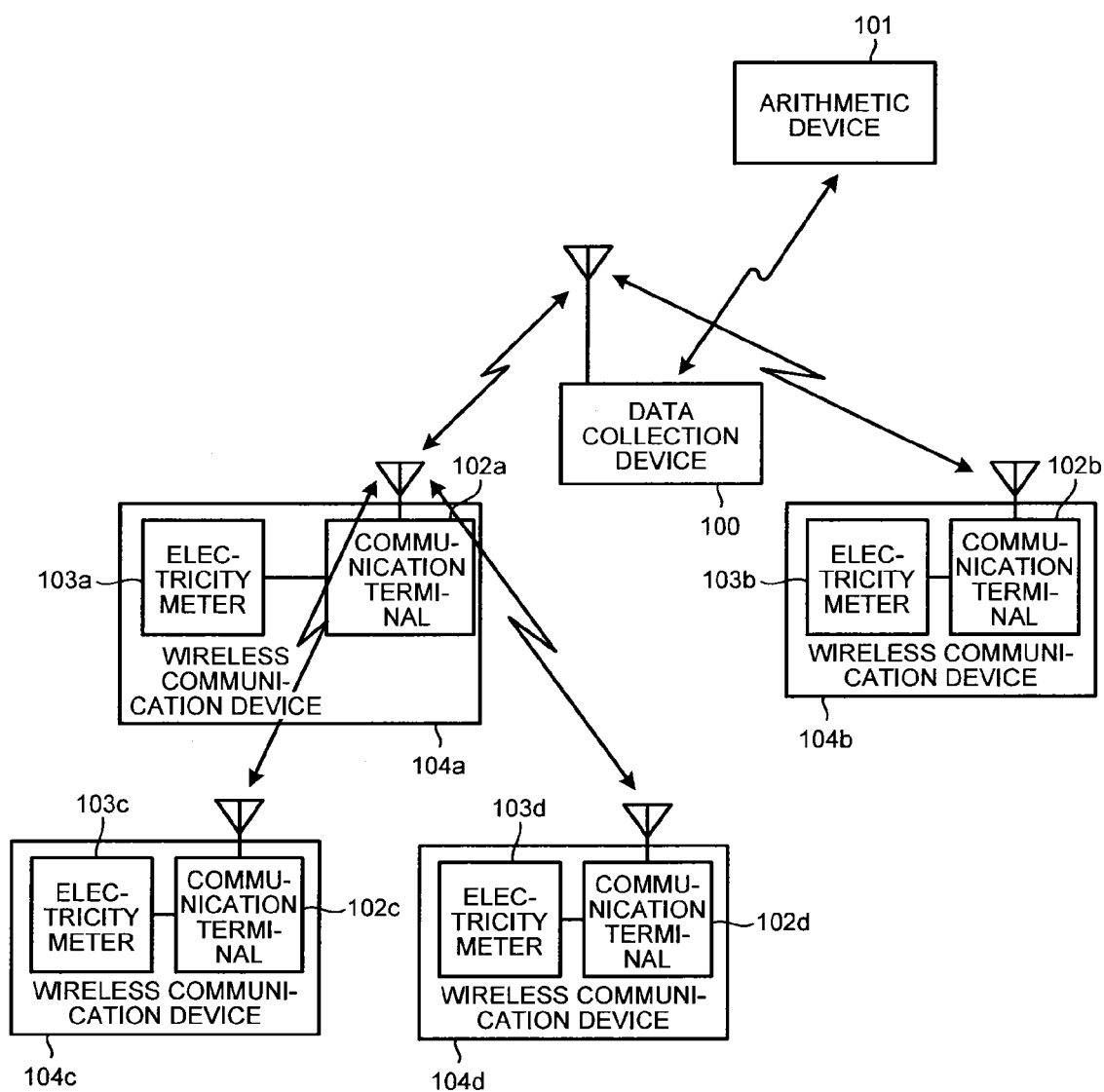
FIG. 10 is a configuration diagram of a configuration of a data collection system according to a sixth embodiment of the present invention.

FIG. 10 is a configuration diagram of a configuration of a data collection system according to a sixth embodiment.

The data collection system is configured to include a data collection device 100, an arithmetic device 101 that is connected to the data collection device 100, communication terminals 102a and 102b that communicate with the data collection device 100, communication terminals 102c and 102d that communicate with the communication terminal 102a, and electricity meters 103a to 103d connected to the communication terminals 102a to 102d, respectively.

The communication terminal 102a and the electricity meter 103a are connected to each other, and constitute a wireless communication device 104a. The communication terminal 102b and the electricity meter 103b are connected to each other, and constitute a wireless communication device 104b. The communication terminal 102c and the electricity meter 103c are connected to each other, and constitute a wireless communication device 104c. In addition, the communication terminal 102d and the electricity meter 103d are connected to each other, and constitute a wireless communication device 104d.

In this system, the wireless communication devices 104a to 104d that are unable to directly communicate with the data collection device 100 because of inability to receive power enough for holding communication or the like realize the communication between the wireless communication devices 104a to 104d and the data collection device 100 by allowing, for example, the wireless communication device 104a to relay signals according to routing information.

Figure 11:
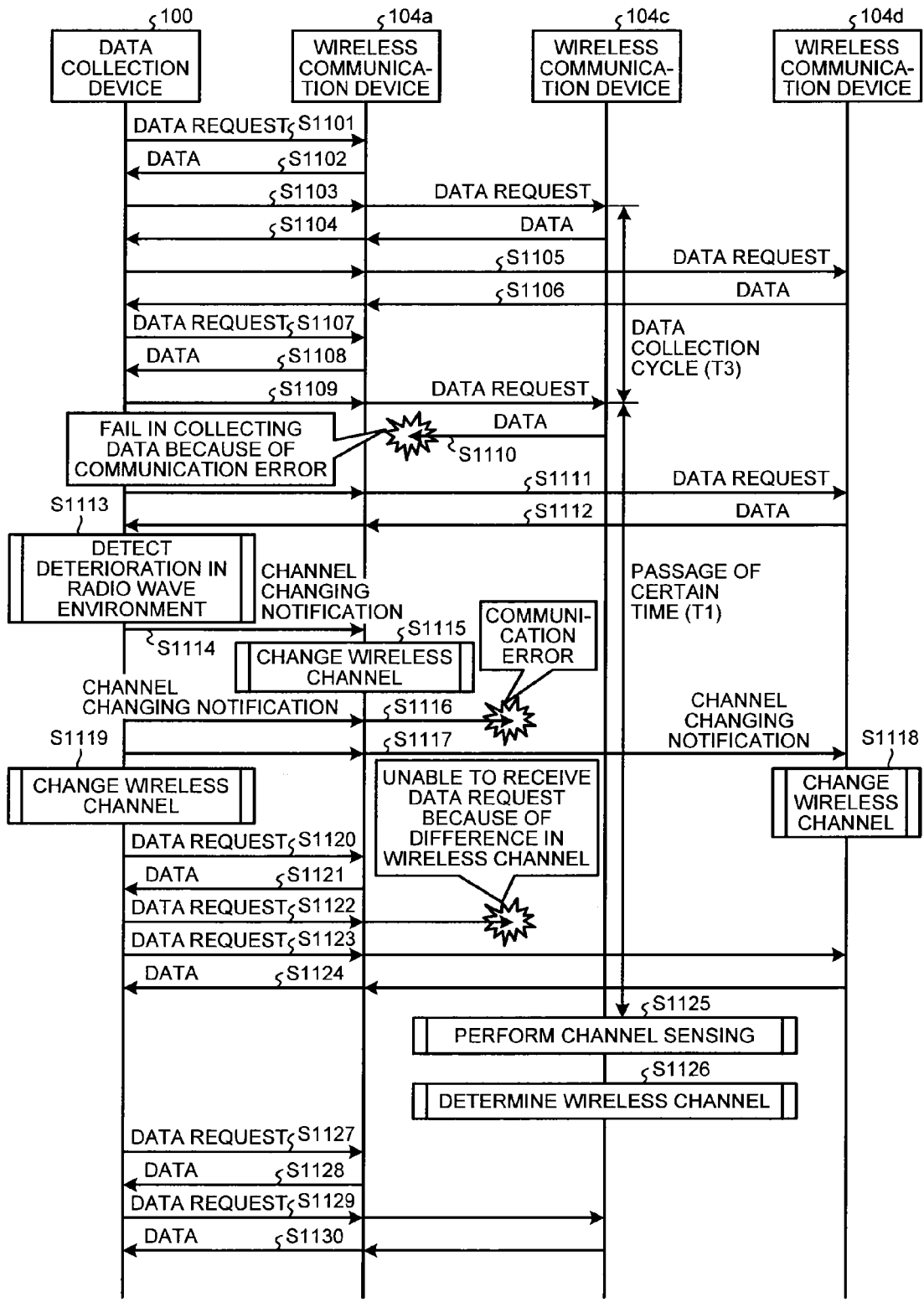
FIG. 11 depicts an operation of the data collection system according to the sixth embodiment of the present invention.

FIG. 11 depicts an operation of the data collection system.

At S1101, the data collection device 100 transmits a data request signal to the wireless communication device 104a. The wireless communication device 104a transmits measured data to the data collection device 100 based on the received data request signal (S1102).

At S1103, the data collection device 100 transmits a data request signal to the wireless communication device 104c via the wireless communication device 104a. The data collection device 100 transmits the data request signal to the wireless communication device 104c via the wireless communication device 104a because the data collection device 100 is unable to receive the power enough to communicate with the wireless communication device 104c. The wireless communication device 104c transmits measured data to the data collection device 100 via the wireless communication device 104a based on the received data request signal (S1104).

At S1105, the data collection device 100 transmits a data request signal to the wireless communication device 104d via the wireless communication device 104a. The data collection device 100 transmits the data request signal to the wireless communication device 104d via the wireless communication device 104a because the data collection device 100 is unable to receive the power enough to communicate with the wireless communication device 104d. The wireless communication device 104d transmits measured data to the data collection device 100 via the wireless communication device 104a based on the received data request signal (S1106).

At S1107, the data collection device 100 transmits again a data request signal to the wireless communication device 104a. The wireless communication device 104a transmits measured data to the data collection device 100 based on the received data request signal (S1108).

At S1109, the data collection device 100 transmits again a data request signal to the wireless communication device 104c via the wireless communication device 104a. The wireless communication device 104c transmits measured data to the data collection device 100 based on the received data request signal (S1110).

However, when a failure in collecting the data transmitted from the wireless communication device 104c occurs (in the wireless communication device 104a or the data collection device 100) because of a communication error, the data collection device 100 detects the deterioration in the radio wave environment (S1113).

At S1111, the data collection device 100 transmits again a data request signal to the wireless communication device 104d via the wireless communication device 104a. The wireless communication device 104d transmits measured data to the data collection device 100 via the wireless communication device 104a based on the received data request signal (S1112).

When the data collection device 100 detects the deterioration in the radio wave environment, the data collection device 100 transmits a channel changing notification to the wireless communication device 104a (S1114). In addition, the wireless communication device 104a changes the wireless channel now in use (by the wireless communication device 104a) to the wireless channel of which the wireless communication device 104a is notified by the channel changing notification (S1115). Similarly to the data request signals, for example, the channel changing notifications are relayed by the wireless communication device 104a to the wireless communication devices 104c and 104d that are unable to directly communicate with the data collection device 100 according to the routing information.

Furthermore, when the data collection device 100 detects the deterioration in the radio wave environment, the data collection device 100 transmits a channel changing notification to the wireless communication device 104c via the wireless communication device 104a. It is assumed here that the wireless communication device 104c has not been unable to change the wireless channel because of the communication error (S1116).

Further, when the data collection device 100 detects the deterioration in the radio wave environment, the data collection device 100 transmits the channel changing notification to the wireless communication device 104d via the wireless communication device 104a (S1117), and the wireless communication device 104d changes the wireless channel now in use (by the wireless communication device 104d) to the wireless channel of which the wireless communication device 104d is notified by the channel changing notification (S1118).

Furthermore, when detecting the deterioration in the radio wave environment, the data collection device 100 changes the wireless channel (used by the data collection device 100 itself) (S1119).

At S1120, the data collection device 100 transmits a data request signal to the wireless communication device 104a by the use of the changed wireless channel. The wireless communication device 104a transmits measured data to the data collection device 100 based on the received data request signal (S1121).

At S1122, the data collection device 100 transmits a data request signal to the wireless communication device 104c by the use of the changed wireless channel. However, the wireless communication device 104c is unable to receive the data request signal because the data collection device 100 has changed the wireless channel.

At S1123, the data collection device 100 transmits a data request signal to the wireless communication device 104d (via the wireless communication device 104a) by the use of the changed wireless channel. The wireless communication device 104d transmits measured data to the data collection device 100 (via the wireless communication device 104a) based on the received data request signal (S1124).

The wireless communication device 104c is unable to receive a new data request signal even after the passage of the certain time (T1) since the wireless communication device 104c has received the previous data request signal (S1109). Accordingly, the wireless communication device 104c performs the channel sensing process for confirming whether the wireless channel for the data communication has been changed (S1125).

Each wireless communication device starts measuring the passing time since the wireless communication device receives the data request signal when receiving the data request signal. The wireless communication device performs the channel sensing process when the wireless communication device has been unable to receive the next data request signal even after the passage of the predetermined time (T1) since the wireless communication device has received the previous data request signal.

Furthermore, the wireless communication device that has been unable to receive the channel changing notification because of a failure that occurs halfway along a transmission path (a communication error) or the like is unable to receive the next data request signal even after the passage of the predetermined time (T1) since the wireless communication device has received the previous data request signal. Accordingly, the wireless communication device performs the channel sensing process and detects the wireless channel used by the data collection device 100.

Further, the data collection device 100 transmits the data request signals at (T3) intervals, and each of the wireless communication devices receives the data request signals (basically) at the intervals.

As a result of the channel sensing process (S1125), when the wireless communication device 104c can confirm the wireless channel for the data communication by the use of which the wireless communication device 104c can receive a new data request signal from the data collection device 100, the wireless communication device 104c determines the wireless channel (S1126).

At S1127, the data collection device 100 transmits a data request signal to the wireless communication device 104a by the use of the changed wireless channel. The wireless communication device 104a transmits measured data to the data collection device 100 by the use of the changed wireless channel based on the received data request signal (S1128).

At S1129, the data collection device 100 transmits a data request signal to the wireless communication device 104c via the wireless communication device 104a by the use of the changed wireless channel. The wireless communication device 104c transmits measured data to the data collection device 100 via the wireless communication device 104a by the use of the wireless channel based on the received data request signal (S1130).

As described above, for example, by allowing the wireless communication device 104a to relay the signals according to the routing information, it is possible to hold the communication between the data collection device 100 and the wireless communication devices 104c and 104d that are unable to directly communicate with the data collection device 100 for the reason that the data collection device 100 is unable to receive the power enough for holding the communication or the like.

In the data collection system that includes such wireless communication devices 104c and 104d, the data collection device 100 transmits the channel changing notification to each of the wireless communication devices and instructs each of the wireless communication devices to change the wireless channel when the data collection device 100 detects the deterioration in the radio wave environment.

Furthermore, each of the wireless communication devices 104c and 104d that has been unable to receive the channel changing notification transmitted from the data collection device 100 detects that the wireless channel used by the data collection device 100 has been changed based on the reception interval of the data request signals, and detects the wireless channel used by the data collection device by performing the channel sensing process. It is thereby possible to collect the data while avoiding a communication error such as an influence of noise.

Seventh Embodiment

FIG. 12 depicts an operation of this data collection system.

At S1201, the data collection device 100 transmits a data request signal to the wireless communication device 104a. The wireless communication device 104a transmits measured data to the data collection device 100 based on the received data request signal (S1202).

At S1203, the data collection device 100 transmits a data request signal to the wireless communication device 104c via the wireless communication device 104a. The data collection device 100 transmits the data request signal to the wireless communication device 104c via the wireless communication device 104a because the data collection device 100 is unable to receive the power enough to communicate with the wireless communication device 104c. The wireless communication device 104c transmits measured data to the data collection device 100 via the wireless communication device 104a based on the received data request signal (S1204).

At S1205, the data collection device 100 transmits a data request signal to the wireless communication device 104d via the wireless communication device 104a. The data collection device 100 transmits the data request signal to the wireless communication device 104d via the wireless communication device 104a because the data collection device 100 is unable to receive the power enough to communicate with the wireless communication device 104d. The wireless communication device 104d transmits measured data to the data collection device 100 via the wireless communication device 104a (S1206).

At S1207, the data collection device 100 transmits again a data request signal to the wireless communication device 104a. The wireless communication device 104a transmits measured data to the data collection device 100 based on the received data request signal (S1208).

At S1209, the data collection device 100 transmits again a data request signal to the wireless communication device 104c via the wireless communication device 104a. The wireless communication device 104c transmits measured data to the data collection device 100 based on the received data request signal (S1210).

However, when the wireless communication device 104a or the data collection device 100 fails in collecting the data transmitted from the wireless communication device 104c because of a communication error, the data collection device 100 detects the deterioration in the radio wave environment (S1213).

At S1211, the data collection device 100 transmits again a data request signal to the wireless communication device 104d via the wireless communication device 104a. The wireless communication device 104d transmits measured data to the data collection device 100 via the wireless communication device 104a based on the received data request signal (S1212).

When the data collection device 100 detects the deterioration in the radio wave environment, the data collection device 100 transmits a channel changing notification to the wireless communication device 104a (S1214). In addition, the wireless communication device 104a changes the wireless channel now in use (by the wireless communication device 104a) to the wireless channel of which the wireless communication device 104a is notified by the channel changing notification (S1215).

Furthermore, when the data collection device 100 detects the deterioration in the radio wave environment, the data collection device 100 transmits a channel changing notification to the wireless communication device 104c via the wireless communication device 104a. It is assumed here that the wireless communication device 104c has, however, not been able to receive the channel changing notification and to change the wireless channel because of a failure (a communication error) (S1216). The channel changing notifications are, similarly to the data request signals, transmitted to the wireless communication devices 104c and 104d that are unable to directly communicate with the data collection device 100 via the wireless communication device 104a according to the routing information.

Further, when the data collection device 100 detects the deterioration in the radio wave environment, the data collection device 100 transmits a channel changing notification to the wireless communication device 104d via the wireless communication device 104a. It is assumed that the wireless communication device 104d has, however, not been able to receive the channel changing notification and to change the wireless channel because of a failure (a communication error) (S1217).

Furthermore, when the data collection device 100 detects the deterioration in the radio wave environment, the data collection device 100 changes the wireless channel (used by the data collection device 100 itself) (S1218).

At S1219, the data collection device 100 transmits a data request signal to the wireless communication device 104a by the use of the changed wireless channel. The wireless communication device 104a transmits measured data to the data collection device 100 based on the received data request signal (S1220).

At S1221, the data collection device 100 transmits a data request signal to the wireless communication device 104c (via the wireless communication device 104a) by the use of the changed wireless channel. Although the data collection device 100 has changed the wireless channel, the wireless communication device 104c is unable to receive the channel changing notification from the data collection device 100 and to receive the data request signal because the wireless communication device 104c has been unable to change the wireless channel. Therefore, the wireless communication device 104c is unable to transmit measured data to the data collection device 100 based on the data request signal.

At S1222, the data collection device 100 transmits a data request signal to the wireless communication device 104d (via the wireless communication device 104a) by the use of the changed wireless channel. Although the data collection device 100 has changed the wireless channel, the wireless communication device 104d is unable to receive the channel changing notification from the data collection device 100 and to receive the data request signal because the wireless communication device 104d has been unable to change the wireless channel. Therefore, the wireless communication device 104d is unable to transmit measured data to the data collection device 100 based on the data request signal.

When the data collection device 100 has transmitted the data request signal to the wireless communication device 104d after changing the wireless channel but is unable to receive desired data from the wireless communication device 104d within a predetermined time, the data collection device 100 transmits a search request signal to this wireless communication device 104d (S1223).

When the wireless communication device directly communicates with the data collection device 100, the wireless communication device directly transmits the search request signal to the data collection device 100. When the wireless communication device such as the wireless communication device 104d communicates with the data collection device 100 by the relay of, for example, the wireless communication device 104a, the data collection device 100 transmits the search request signal (a search message) to the wireless communication device 104d on the communication path via the wireless communication device 104a. When the wireless communication device such as the wireless communication device 104d communicates with the data collection device 100, the communication can be held even with the power used by the wireless communication device 104d held down as compared with the direct communication of the wireless communication device with the data collection device 100. Furthermore, by multiple relay of the wireless communication devices (multi-hop relay), it is possible to construct the data collection system in a wide range.

When the wireless communication device such as the wireless communication device 104d has communicated with the data collection device 100 via, for example, the wireless communication device 104a, the data collection device 100 transmits first the search signal to the wireless communication device 104a. The wireless communication device 104a returns the wireless channel that has been changed based on the channel changing notification from the data collection device 100 to the original wireless channel (S1224). Thereafter, the wireless communication device 104a transmits the search message to the wireless communication device 104d (S1225). The search message includes information on the wireless channel to be changed.

The wireless communication device 104d is unable to change the wireless channel because the wireless communication device 104d has not been able to receive the channel changing notification from the data collection device 100. By returning the wireless channel to the wireless channel used before a wireless-channel changing process at S1224, the search message can be transmitted or received between the data collection device 100 and the wireless communication device 104d. This example is on the premise that the wireless communication device 104a has performed the wireless-channel changing process. However, when the wireless communication device 104a has not been able to perform the wireless-channel changing process, the data collection device 100 performs a similar wireless-channel changing (returning) process.

The wireless communication device 104d that has received the search message changes the wireless channel to be used according to the information on the wireless channel included in the search message (S1226).

After transmitting the search message to the wireless communication device 104d, the wireless communication device 104a returns the wireless channel used before receiving the channel changing notification to the wireless channel after receiving the channel changing notification (S1227).

The detection of the wireless communication device that has been unable to collect the data after the data collection device 100 changes the wireless channel can be made by either the data collection device 100 or the arithmetic device 101 connected to the data collection device 100.

Furthermore, when the data collection device 100 has transmitted the data request signal to the wireless communication device 104c after changing the wireless channel but is unable to receive desired data from the wireless communication device 104c within a predetermined time, the data collection device 100 transmits a search request signal to this wireless communication device 104c (S1228). When the wireless communication device such as the wireless communication device 104c communicates with the data collection device 100 by the relay of the wireless communication device 104a, the search request signal (the search message) is transmitted to the wireless communication device 104c via the wireless communication device 104a.

When the wireless communication device such as the wireless communication device 104c communicates with the data collection device 100 via the wireless communication device 104a, the data collection device 100 transmits first the search request signal to the wireless communication device 104a. The wireless communication device 104a returns the wireless channel that has been changed based on the channel changing notification from the data collection device 100 to the original wireless channel (S1229). Thereafter, the wireless communication device 104a transmits the search message to the wireless communication device 104c (S1230).

It is assumed here that the wireless communication device 104c is unable to receive the search message because of a failure (a communication error).

Furthermore, after transmitting the search message to the wireless communication device 104c, the wireless communication device 104a returns the wireless channel used before receiving the channel changing notification to the wireless channel after the channel changing notification (S1231).

When the wireless communication device 104c is still unable to receive a new data request signal even after the passage of the predetermined time period (T1) since the wireless communication device 104c has received the previous data request signal (S1209), the wireless communication device 104c performs the channel sensing process for confirming whether the wireless channel for the data communication has been changed (S1232).

Each of the wireless communication devices starts measuring the passing time since the wireless communication device receives the data request signal when receiving the data request signal.

Each of the wireless communication devices performs the channel sensing process when the wireless communication device has not been able to receive the next data request signal even after the passage of the predetermined time (T1) since the wireless communication device has received the previous data request signal.

Furthermore, the wireless communication device that has been unable to receive the channel changing notification because of a failure (a communication error) that occurs halfway along the transmission path or the like is unable to receive the next data request signal even after the passage of the predetermined time (T1) since the wireless communication device has received the previous data request signal. Accordingly, the wireless communication device performs the channel sensing process and detects the wireless channel used by the data collection device 100.

Further, the data collection device 100 transmits the data request signal at the (T3) intervals, and each of the wireless communication devices receives these data request signals (basically) at the intervals.

As a result of the channel sensing process (S1232), when the wireless communication device 104c can confirm the wireless channel for the data communication by the use of which the wireless communication device 104c can receive a new data request signal from the data collection device 100, the wireless communication device 104c determines the wireless channel (S1233).

At S1234, the data collection device 100 transmits a data request signal to the wireless communication device 104a by the use of the changed wireless channel. The wireless communication device 104a transmits measured data to the data collection device 100 by the use of the changed wireless channel based on the received data request signal (S1235).

At S1236, the data collection device 100 transmits a data request signal to the wireless communication device 104c via the wireless communication device 104a by the use of the changed wireless channel. The wireless communication device 104c transmits measured data to the data collection device 100 via the wireless communication device 104a by the use of the changed wireless channel based on the received data request signal (S1237).

At S1238, the data collection device 100 transmits a data request signal to the wireless communication device 104d via the wireless communication device 104a by the use of the changed wireless channel. The wireless communication device 104d transmits measured data to the data collection device 100 via the wireless communication device 104a by the use of the wireless channel based on the received data request signal (S1239).

As described above, by transmitting the search message to the wireless communication device 104d that has not been able to hold communication after the wireless channel has been changed based on the channel changing notification by the use of the wireless channel used before the change, it is possible to notify the wireless communication device 104d of the new wireless channel and to change the channel.

Furthermore, the wireless communication device 104c that has not been able to receive the search message can detect that the data collection device 100 has possibly changed the wireless channel from the reception interval of the data request signals, and can detect the wireless channel used by the data collection device 100 by performing the channel sensing process. It is possible to collect the data while avoiding an influence of noise or the like.

REFERENCE SIGNS LIST 10 data collection device, 11 arithmetic device, 12a to 12d communication terminal, 13a to 13d electricity meter, 14a to 14d wireless communication device, 100 data collection device, 101 arithmetic device, 102a to 102d communication terminal, 103a to 103d electricity meter, 104a to 104d wireless communication device.

The invention claimed is:

1. A data collection system comprising:
   a data collection device; and
   at least one wireless communication device configured to select one wireless channel from a plurality of wireless channels, and configured to hold a wireless communication between the data collection device and the wireless communication device, wherein
   the wireless communication device starts measuring a first time when the wireless communication device receives a wireless signal from the data collection device,
   when the wireless communication device receives another wireless signal from the data collection device before the first time exceeds a first predetermined time, the wireless communication device remains on the one wireless channel selected from the plurality of wireless channels, and
   when the wireless communication device does not receive another wireless signal from the data collection device before the first time exceeds the first predetermined time:
      the wireless communication device changes to another wireless channel of the plurality of wireless channels, and transmits a detection signal for detecting the data collection device and starts measuring a second time after changing to the other wireless channel,
      the wireless communication device determines a new channel for communication with the data collection device as the other wireless channel when the wireless communication device receives a response signal from the data collection device in response to the detection signal before the second time exceeds a second predetermined time, and
      the wireless communication device changes to a further wireless channel and transmits another detection signal when the wireless communication device does not receive the response signal from the data collection device in response to the detection signal before the second time exceeds the second predetermined time.

2. The data collection system according to claim 1, wherein
   the data collection device transmits a data request signal to each wireless communication device in a certain cycle, and
   the wireless communication device changes to the other wireless channel when the wireless communication device has not received a data signal from the data collection device in response to the data request signal for the first predetermined time which is a time period equal to or longer than a transmission interval of transmitting the data request signal from the data collection device.

3. The data collection system according to claim 1, wherein the detection signal and the response signal in response to the detection signal are transmitted by broadcast communication.

4. The data collection system according to claim 3, wherein the data collection device that has received the detection signal stops transmitting the response signal in response to the detection signal when the data collection device has received a second response signal in response to a second detection signal transmitted from another wireless communication device before the data collection device transmits the response signal in response to the detection signal.

5. The data collection system according to claim 1, wherein the data collection device transmits a channel changing notification so as to notify the wireless communication device of a newly used wireless channel, and the wireless communication device that has received the channel changing notification changes to the newly used wireless channel.

6. The data collection system according to claim 1, wherein
   each of the data collection device and the wireless communication device includes a storage unit that stores therein routing information, and
   when the wireless communication device is unable to hold the wireless communication with the data collection device, the wireless communication device communicates with the data collection device by using another wireless communication device according to the routing information.

7. The data collection system according to claim 1, wherein when the wireless communication device has been unable to communicate with the data collection device after change to the other wireless channel, the wireless communication device notifies the data collection device of a new wireless channel by use of the wireless channel before the change, and the data collection device that has been notified of the new wireless channel changes to the new wireless channel of which the data collection device is notified.

8. A data collection system comprising:
   a data collection device; and
   at least one wireless communication device configured to select one wireless channel among a plurality of wireless channels, and to hold a wireless communication between the data collection device and the wireless communication device, wherein
   the wireless communication device starts measuring a first time when the wireless communication device receives a wireless signal from another wireless communication device,
   when the wireless communication device receives another wireless signal from the data collection device before the first time exceeds a first predetermined time, the wireless communication device remains on the one wireless channel selected from the plurality of wireless channels, and
   when the wireless communication device does not receive another wireless signal from the other wireless communication device before the first time exceeds the first predetermined time:
      the wireless communication device changes to another wireless channel of the plurality of wireless channels, and transmits a detection signal for detecting the other wireless communication device and starts measuring a second time after changing to the other wireless channel,
      the wireless communication device determines a new channel for communication with the other wireless communication device as the other wireless channel when the wireless communication device receives a response signal from the other wireless communication device in response to the detection signal before the second time exceeds a second predetermined time, and
      the wireless communication device changes to a further wireless channel and transmits another detection signal when the wireless communication device does not receive the response signal from the other wireless communication device in response to the detection signal before the second time exceeds the second predetermined time.

9. A wireless communication device for selecting one wireless channel among a plurality of wireless channels, and for holding a wireless communication with a data collection device, the wireless communication device comprising:
   a communication terminal; and
   a meter circuit, wherein
   the wireless communication device starts measuring a first time when the wireless communication device receives a wireless signal from the data collection device, when the wireless communication device receives another wireless signal from the data collection device before the first time exceeds a first predetermined time, the wireless communication device remains on the one wireless channel selected from the plurality of wireless channels, and when the wireless communication device does not receive another wireless signal from the data collection device before the first time exceeds the first predetermined time:

the wireless communication device changes to another wireless channel of the plurality of wireless channels, and transmits a detection signal for detecting the data collection device and starts measuring a second time after changing to the other wireless channel, the wireless communication device determines a new channel for communication with the data collection device as the other wireless channel when the wireless communication device receives a response signal from the data collection device in response to the detection signal before the second time exceeds a second predetermined time, and the wireless communication device changes to a further wireless channel and transmits another detection signal when the wireless communication device does not receive the response signal from the data collection device in response to the detection signal before the second time exceeds the second predetermined time.

10. A data collection device for selecting one wireless channel among a plurality of wireless channels, and holding a wireless communication with a wireless communication device, the data collection device comprising:

a communication terminal; and a meter circuit, wherein when the data collection device cannot receive a data signal from the wireless communication device, the data collection device changes to another wireless channel and transmits a wireless signal to the wireless communication device, the wireless communication device starts measuring a first time when the wireless communication device receives the wireless signal from the data collection device via the one wireless channel selected from the plurality of wireless channels, when the wireless communication device receives another wireless signal from the data collection device before the first time exceeds a first predetermined time, the wireless communication device remains on the one wireless channel selected from the plurality of wireless channels, and when the wireless communication device does not receive another wireless signal from the data collection device before the first time exceeds the first predetermined time:

the wireless communication device changes to a further wireless channel, and transmits a detection signal for detecting the data collection device and starts measuring a second time after changing to the further wireless channel, when the wireless communication device receives a response signal from the data collection device in response to the detection signal before the second time exceeds a second predetermined time, the wireless communication device determines a new channel for communication with the data collection device as the further wireless channel, the wireless communication device changes to a third wireless channel and transmits another detection signal when the wireless communication device does not receive the response signal from the data collection device in response to the detection signal before the second time exceeds the second predetermined time, and when the data collection device receives the detection signal from the wireless communication device, the data collection device transmits the response signal to the wireless communication device in response to the detection signal.

11. A communication method of a data collection system including a data collection device, and at least one wireless communication device, selecting one wireless channel among a plurality of wireless channels, and holding a wireless communication between the data collection device and the wireless communication device, the communication method comprising:

causing the wireless communication device to start measuring a first time when the wireless communication device receives a wireless signal from the data collection device;

when the wireless communication device receives another wireless signal from the data collection device before the first time exceeds a first predetermined time, causing the wireless communication device to remain on the one wireless channel selected from the plurality of wireless channels; and when the wireless communication device does not receive another wireless signal from the data collection device before the first time exceeds the first predetermined time:

causing the wireless communication device to change to another wireless channel, and to transmit a detection signal for detecting the data collection device and to start measuring a second time after changing to the other wireless channel, causing the wireless communication device to determine a new channel for communication with the data collection device as the other wireless channel when the wireless communication device receives a response signal from the data collection device in response to the detection signal before the second time exceeds a second predetermined time, and causing the wireless communication device to change to a further wireless channel and to transmit another detection signal when the wireless communication device does not receive the response signal from the data collection device in response to the detection signal before the second time exceeds the second predetermined time.

* * * * *